(12) United States Patent
Tsai et al.

(10) Patent No.: US 8,405,373 B2
(45) Date of Patent: *Mar. 26, 2013

(54) SYSTEMS AND METHODS FOR INTELLIGENTLY OPTIMIZING OPERATING EFFICIENCY USING VARIABLE GATE DRIVE VOLTAGE

(75) Inventors: Fu-Sheng Tsai, Northborough, MA (US); Abey K. Mathew, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/341,031

(22) Filed: Dec. 30, 2011

(65) Prior Publication Data

US 2012/0098511 A1    Apr. 26, 2012

Related U.S. Application Data

(63) Continuation of application No. 12/387,188, filed on Apr. 29, 2009, now Pat. No. 8,125,200.

(51) Int. Cl.
  *G05F 1/565* (2006.01)
(52) U.S. Cl. .......... 323/283; 323/272; 323/285
(58) Field of Classification Search .......... 323/267, 323/272, 282, 283, 285; 363/21.05, 21.13
  See application file for complete search history.

(56) References Cited

U.S. PATENT DOCUMENTS

| | | | |
|---|---|---|---|
| 6,173,350 B1 * | 1/2001 | Hudson et al. | 710/100 |
| 7,265,601 B2 | 9/2007 | Ahmad | |
| 7,372,240 B2 | 5/2008 | Khayat et al. | |
| 8,125,200 B2 * | 2/2012 | Tsai et al. | 323/267 |
| 2002/0036486 A1 | 3/2002 | Zhou et al. | |
| 2005/0281058 A1 | 12/2005 | Batarseh et al. | |
| 2006/0119332 A1 | 6/2006 | Elbanhawy | |
| 2008/0001553 A1 | 1/2008 | Qiu et al. | |
| 2008/0209236 A1 | 8/2008 | Shaver et al. | |
| 2008/0258697 A1 | 10/2008 | Gehrke | |
| 2008/0265683 A1 | 10/2008 | Zhu et al. | |
| 2009/0153111 A1 | 6/2009 | Mao et al. | |
| 2010/0277151 A1 | 11/2010 | Tsai et al. | |

OTHER PUBLICATIONS

Tsai et al., "Systems and Methods for Intelligently Optimizing Operating Efficiency Using Variable Gate Drive Voltage", U.S. Appl. No. 12/387,188, Office Action, Mar. 29, 2011, 20 pgs.
Tsai et al., "Systems and Methods for Intelligently Optimizing Operating Efficiency Using Variable Gate Drive Voltage", U.S. Appl. No. 12/387,188, Amendment, Jun. 24, 2011, 25 pgs.
Tsai et al., "Systems and Methods for Intelligently Optimizing Operating Efficiency Using Variable Gate Drive Voltage", U.S. Appl. No. 12/387,188, Final Office Action, Aug. 26, 2011, 16 pgs.
Tsai et al., "Systems and Methods for Intelligently Optimizing Operating Efficiency Using Variable Gate Drive Voltage", U.S. Appl. No. 12/387,188, Amendment, Oct. 17, 2011, 27 pgs.

(Continued)

*Primary Examiner* — Adolf Berhane
*Assistant Examiner* — Fred E Finch, III
(74) *Attorney, Agent, or Firm* — O'Keefe, Egan, Peterman & Enders LLP

(57) ABSTRACT

Systems and methods for intelligently optimizing voltage regulation efficiency for information handling systems by varying gate drive voltage value based on measured operating efficiency and/or other voltage regulation operating parameters. Different voltage regulation operating parameters may be dynamically monitored and recorded during a power conversion process, and these operating parameters may then be used to dynamically and variably control gate drive voltage level to improve/optimize voltage regulation operating efficiency performance.

33 Claims, 10 Drawing Sheets

OTHER PUBLICATIONS

Tsai et al., "Systems and Methods for Intelligently Optimizing Operating Efficiency Using Variable Gate Drive Voltage", U.S. Appl. No. 12/387,188, Notice of Allowance and Fees Due, Oct. 24, 2011, 6 pgs.

Tsai et al., "Systems and Methods for Intelligently Optimizing Operating Efficiency Using Variable Gate Drive Voltage", U.S. Appl. No. 12/387,188, Amendment After Allowance, Oct. 31, 2011, 27 pgs.

* cited by examiner

SYSTEMS AND METHODS FOR INTELLIGENTLY OPTIMIZING OPERATING EFFICIENCY USING VARIABLE GATE DRIVE VOLTAGE

This patent application is a continuation of prior U.S. application Ser. No. 12/387,188 filed on Apr. 29, 2009 now U.S. Pat. No. 8,125,200 and entitled "Systems And Methods For Intelligently Optimizing Operating Efficiency Using Variable Gate Drive Voltage", which is hereby incorporated herein by reference in its entirety for all purposes.

FIELD OF THE INVENTION

This invention relates generally to voltage regulators, and more particularly to optimizing operating efficiency.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Gate drive voltage level has been demonstrated to impact on DC/DC voltage regulation down device (VRD) operating efficiency. Other factors which determine VRD efficiency include operating frequency, type of switching device employed, input voltage, and output current. Traditionally, VRDs have employed fixed designs with operating efficiency that is maximized for higher current loads to ensure proper thermal management. Such approaches tend to compromise operating efficiency when operating in lighter current load ranges. Various techniques have been proposed for improving operating efficiency when VRDs are operating at lighter current loads, including phase-shedding and employing fixed gate drive voltage level changes (i.e., switching from one pre-determined and fixed gate drive voltage level value to another pre-determined and fixed gate drive voltage level value).

SUMMARY OF THE INVENTION

Disclosed herein are systems and methods for intelligently optimizing voltage regulation efficiency for information handling systems by varying gate drive voltage values based on measured operating efficiency and/or other measured voltage regulation operating parameters. In one embodiment, the disclosed systems and methods may be implemented (e.g., using digital control and power monitoring) to dynamically monitor and record different operating parameters during a power conversion process. For example, operating parameters such as input/output currents, input/output voltages and input/output power may be measured and operating efficiency calculated in real time therefrom. These operating parameters may then be used to dynamically and variably control gate drive voltage level to improve/optimize voltage regulation operating efficiency performance.

In one exemplary embodiment, DC/DC voltage regulation circuitry may be provided with main voltage regulation circuitry (main VR) that creates current of appropriate voltage for powering the load of an information handling system, and a variable-output (e.g., high-efficiency) gate drive voltage regulation circuitry (gate VR) that is configured to create varying values of gate drive voltage that is provided to the main VR. In this embodiment, the gate VR may produce a gate drive voltage having a value that is selected to dynamically optimize the operating efficiency of the main VR relative to the main VR design and real time operating parameter conditions. In this regard, operating efficiency for the main VR may be calculated in real time from one or more measured operating parameters, such as input/output currents, input/output voltages and/or input/output power levels.

Thus, using the disclosed systems and methods, voltage regulation system efficiency may be controlled and optimized/improved in a manner that is not limited by design characteristics or particular real time operating conditions of the voltage regulation circuitry, i.e., in the way that conventional fixed gate drive voltage level change techniques are so limited. Further, the disclosed systems and methods may be employed to optimize efficiency in a closed loop manner that is not restricted to limited load range(s) and that is not performed in the open loop manner of such prior fixed gate drive voltage level change techniques (i.e., once the gate drive voltage levels are set in such prior techniques, the efficiency impacts are dictated by the circuit design and the operating conditions of the given system). Further, the disclosed systems and methods may be implemented in one exemplary embodiment using a single variable-output voltage regulator component design that is configured to produce varying gate drive voltage levels that are optimized for different operating environments and power consumption scenarios, i.e., rather than requiring multiple different voltage regulator component designs to be used for different operating environments and different power consumption environments.

In one respect, disclosed herein is a method for regulating voltage in an information handling system, including: providing DC/DC voltage regulation circuitry coupled to supply power to a system load of the information handling system, the DC/DC voltage regulation circuitry including a power processing circuit including one or more drive transistors; regulating power supplied by the DC/DC voltage regulation circuitry to the system load of the information handling system by driving the gate of the one or more drive transistors of the power processing circuit with two or more different gate drive voltage levels; determining two or more real time operating efficiency values of the power processing circuit while the power processing circuit is driven at each of two or more respective gate drive voltage levels; and varying the value of the gate drive voltage level used to drive the gate of the one or more drive transistors of the power processing circuit based on a comparison of the determined two or more real time operating efficiency values of the power processing circuit.

In another respect, disclosed herein is DC/DC voltage regulation circuitry for an information handling system, including: a power processing circuit configured to provide current of regulated output DC voltage to power a system load of an information handling system, the power processing circuit including one or more drive transistors; power monitoring controller circuitry configured to determine real time operating efficiency values of the power processing circuit while the power processing circuit is driven at different gate drive voltage levels; gate drive voltage regulation circuitry configured to provide gate drive voltage to drive the gate of the one or more drive transistors of the power processing circuit with two or more different gate drive voltage levels; and gate drive voltage controller circuitry configured to control the level of gate drive voltage provided by the gate drive voltage regulation circuitry based on the measured real time operating efficiency values of the power processing circuit.

In another respect, disclosed herein is an information handling system, including: a system load; and DC/DC voltage regulation circuitry including: a power processing circuit coupled to provide current of regulated output DC voltage to power the system load, the power processing circuit including one or more drive transistors, power monitoring controller circuitry configured to determine real time operating efficiency values of the power processing circuit while the power processing circuit is driven at different gate drive voltage levels, gate drive voltage regulation circuitry configured to provide gate drive voltage to drive the gate of the one or more drive transistors of the power processing circuit with two or more different gate drive voltage level, and gate drive voltage controller circuitry configured to control the level of gate drive voltage provided by the gate drive voltage regulation circuitry based on the measured real time operating efficiency values of the power processing circuit.

DESCRIPTION OF ILLUSTRATIVE EMBODIMENTS

Figure 1:
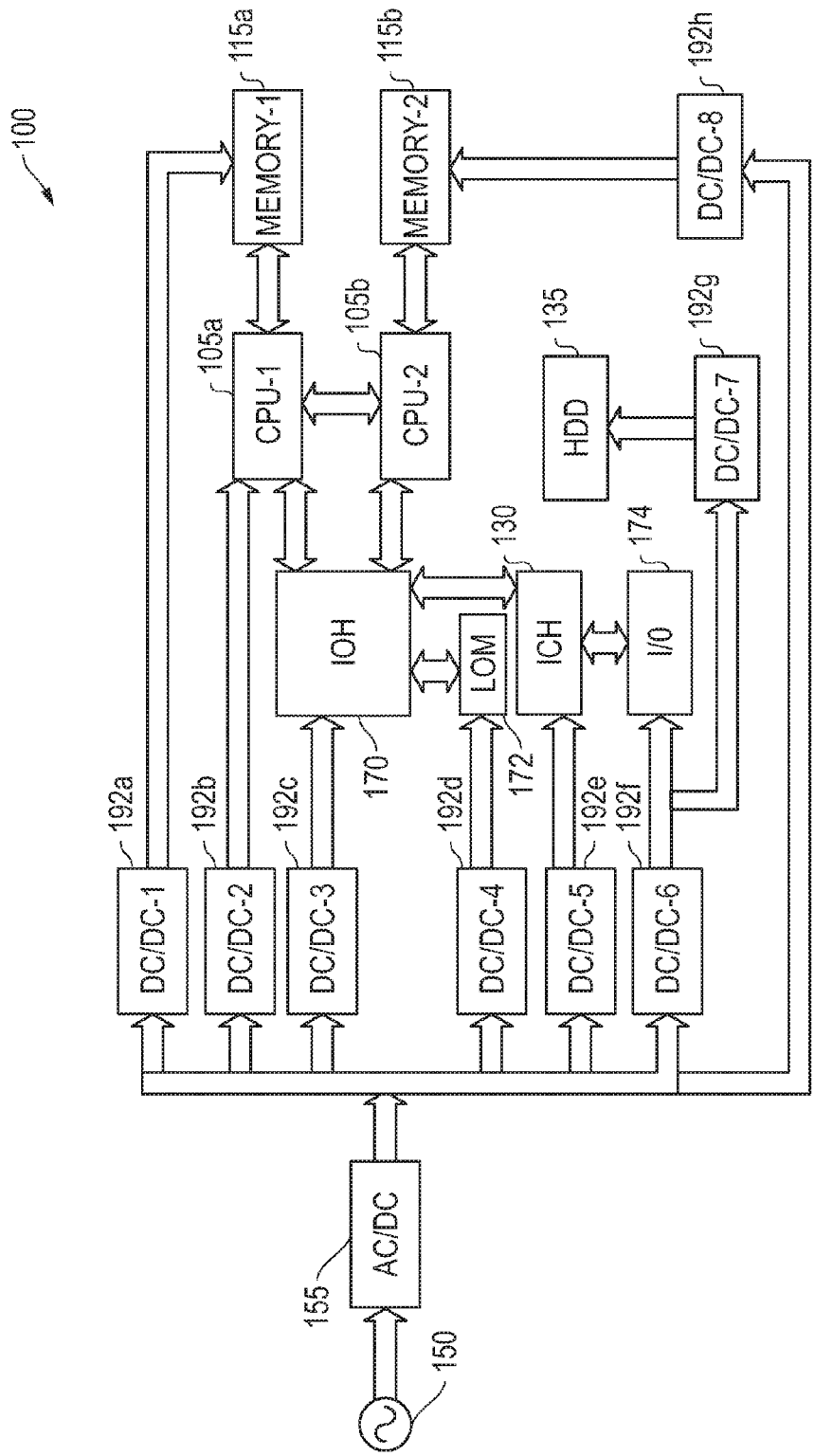
FIG. 1 is a simplified block diagram of an information handling system configured according to one exemplary embodiment of the disclosed systems and methods.

FIG. 1 is a block diagram of an information handling system 100 as it may be configured in a server configuration according to one exemplary embodiment of the disclosed systems and methods. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

As shown in FIG. 1, information handling system 100 of this exemplary embodiment includes central processor units (CPUs) 105a and 105b, each of which may be an Intel Pentium series processor, an Advanced Micro Devices (AMD) processor or one of many other processors currently available. Each of CPUs 105a and 105b are coupled through an input/output hub (IOH) 170 to a local area network on motherboard (LOM) 172, and Intel controlled hub (ICH) chip 130 which is provided to facilitate input/output functions for the information handling system, and which itself is coupled to input/output 174. System memory components 115a and 115b are coupled as shown to respective CPUs 105a and 105b. As shown, media drives in the form of a hard disk media drive (HDD) 135 or other suitable form of media drive may also be provided for permanent storage of the information handling system.

In this particular embodiment, information handling system 100 is coupled to a source of AC power, namely AC mains 150. An AC/DC conversion circuitry (power supply) 155 is coupled to AC mains 150 to convert AC Power from the line to regulated DC voltage and feeds it to the input of multiple DC/DC voltage regulation circuitries 192a-192h (which are exemplary in number and may be greater or fewer in number). Multiple DC/DC voltage regulation circuitries 192a-192h provide particular components of information handling system 100 (i.e., taken together as a system load) with a regulated DC power source as shown. Because power drawn by the various components of information handling system may vary over time, the combined system load and operating conditions of each of DC/DC voltage regulation circuitries 192a-192h may also vary with time. It will be understood that FIG. 1 is exemplary only, and that the disclosed systems and methods may be implemented to power one or more system load components of any other configuration of information handling system. Further, DC/DC voltage regulation circuitries 192a-192h may be implemented, for example, as part of a voltage regulation down device (VRD) or voltage regulation module (VRM) that receives DC power from an AC to DC power supply unit (PSU) configuration. Alternatively, one or more components of DC/DC voltage regulation circuitries 192a-192h may be integrated as part of an AC/DC PSU.

Figure 2A:
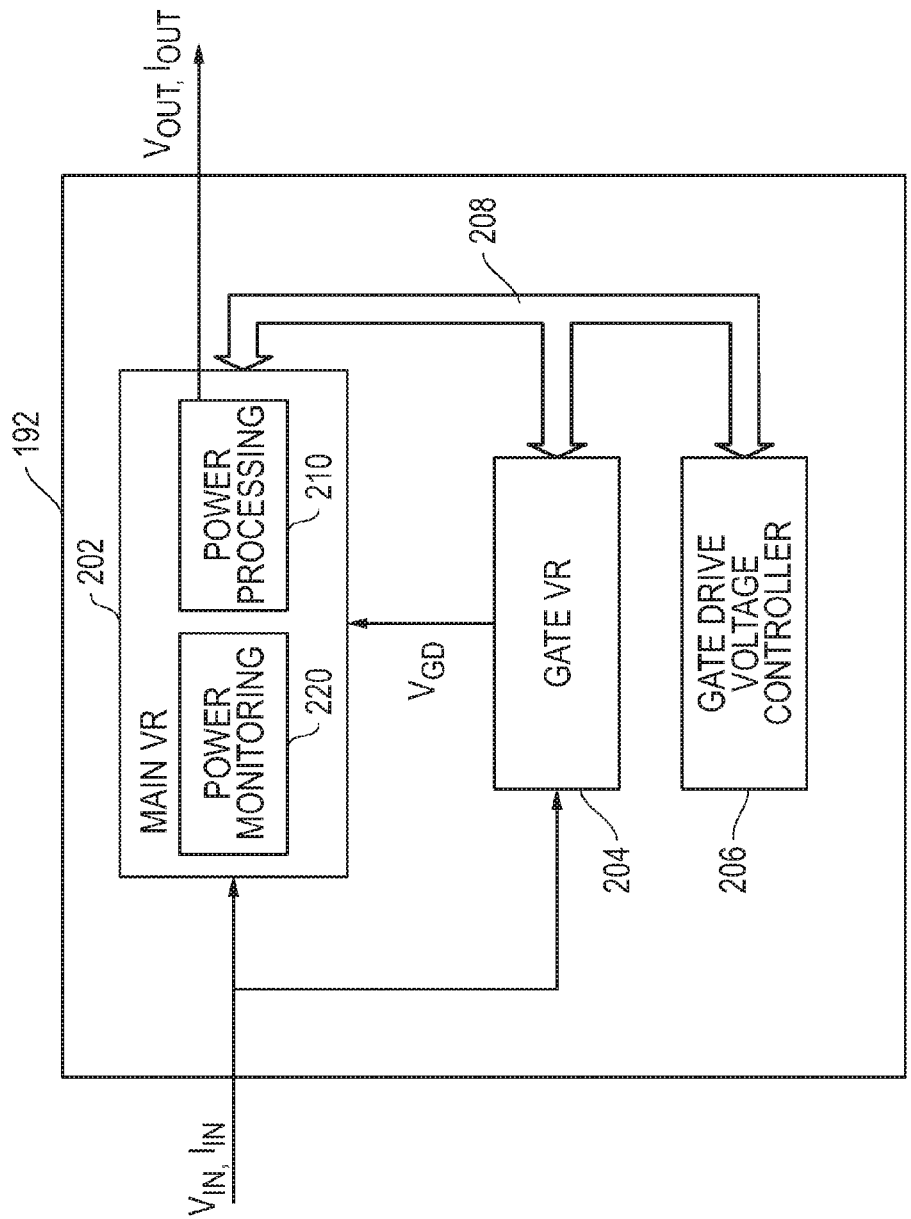
FIG. 2A is a simplified block diagram of DC/DC voltage regulation circuitry configured according to one exemplary embodiment of the disclosed systems and methods.

FIG. 2A shows DC/DC voltage regulation circuitry 192 as it may be implemented for individual voltage regulation circuitries 192a-192h of FIG. 1 according to one exemplary embodiment of the disclosed systems and methods. In this exemplary embodiment, DC/DC voltage regulation circuitry 192 includes main voltage regulation circuitry (main VR) 202 that is coupled to receive input DC voltage ($V_{IN}$) (e.g., 12 volts DC input from AC/DC conversion circuitry 155 and is coupled to provide a regulated output DC voltage ($V_{OUT}$) and current ($I_{OUT}$) for powering system load components (e.g., 1.2 volts DC to components of information handling system 100 of FIG. 1). As shown, DC/DC voltage regulation circuitry 192 includes power processing circuit 210 that is controlled to produce current of regulated output DC voltage $V_{OUT}$. In this regard, power processing circuit 210 of DC/DC voltage regulation circuitry 192 may include, for example, two drive transistors (e.g., metal oxide field effect transistors "MOSFETs") that are switched alternately between ON and OFF states at a given duty cycle ("D") using a drive voltage applied to respective gates of the drive transistors to control $V_{OUT}$. In this regard, the value of duty cycle (D) may be determined by power monitoring controller circuitry 220 (described below) and defines the relative percentage of time that main transistor S1 is turned on (e.g., main transistor S1 and other transistor S2 may be switched alternately so that only one of S1 and S2 are on at a given time).

In the illustrated embodiment of FIG. 2A, main VR 202 may further include power monitoring controller circuitry 220 that measures real time (i.e., instantaneous) operating parameters such as $V_{IN}$, $V_{OUT}$, $I_{IN}$, $I_{OUT}$, etc. and/or calculates real time operating parameters such as operating efficiency and duty cycle ("D") of main VR 202, etc. Tasks of power monitoring controller circuitry 220 may be performed by any circuitry that is suitable for making such measurements and/or calculations, e.g., analog measurement circuitry coupled to microcontroller or processor that is configured to perform calculation and communication tasks. Furthermore, it will be understood that tasks of power monitoring controller circuitry 220 may alternatively be performed in other embodiments by circuitry provided separate from a main VR of an information handling system, e.g., as a completely separate circuit or as a circuit combined with one or both of gate drive voltage regulation circuitry (gate VR) 204 or gate drive voltage controller circuitry 206 that are described further herein.

As shown in FIG. 2A, DC/DC voltage regulation circuitry 192 of this embodiment also includes gate drive voltage regulation circuitry (gate VR) 204 that causes application of a gate drive voltage $V_{GD}$ to transistor gates of main VR 202 as shown. In this embodiment, gate VR 204 is configured to provide a variable level of gate drive voltage $V_{GD}$ to main VR 202. Gate VR 204 may include any circuitry configuration that is suitable for converting the level of an input voltage $V_{IN}$ (e.g., 12 volts) to a variable gate drive voltage $V_{GD}$ level that is selectable in real time from a range of possible voltage values (e.g., from about 5 volts to about 12 volts). One exemplary embodiment of such circuitry is illustrated in FIG. 2B and described further herein.

Still referring to FIG. 2A, DC/DC voltage regulation circuitry 192 also includes gate drive voltage controller 206 that is coupled to each of main VR 202 and gate VR 204 by communication bus 208 which may be, for example, system management bus (SMBus), power management bus (PMBus), inter-integrated circuitry ($I^2C$) bus, etc. Gate drive voltage controller 206 may include any suitable configuration of circuitry that is configured to perform the communication and control tasks of gate drive voltage controller 206 described herein, e.g., microcontroller and/or processor coupled to memory, etc.

Figure 2B:
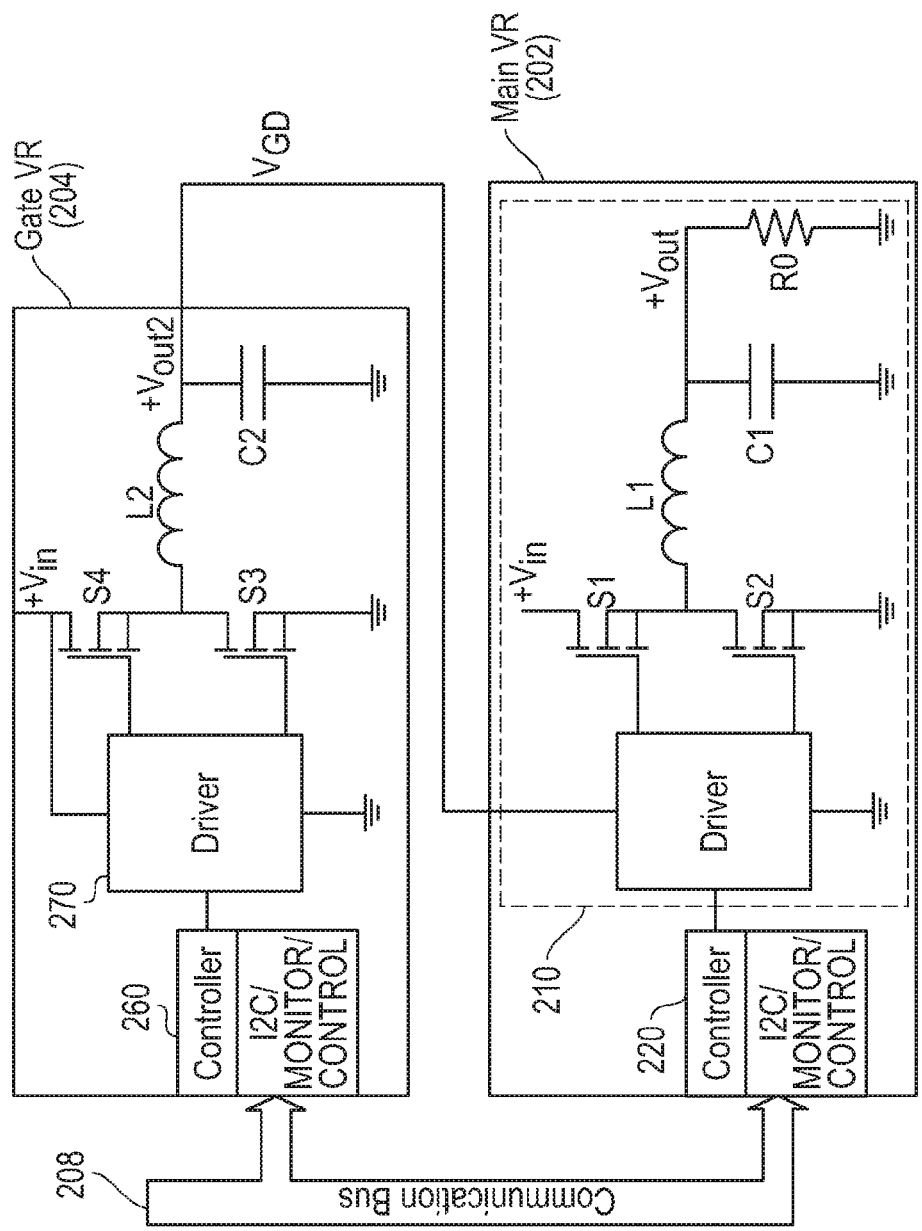
FIG. 2B is a simplified block diagram of main VR circuitry and gate VR circuitry configured according to one exemplary embodiment of the disclosed systems and methods.

FIG. 2B further illustrates one exemplary embodiment of gate VR 204 as it may be coupled to main VR 202. As shown, gate VR 204 includes monitoring control circuitry 260 that itself includes I2C/monitor/control circuitry interface and controller components (e.g., that may be implemented by one or more processors or microcontrollers) which are communicatively coupled to communication bus 208 previously described. In this embodiment, monitoring control circuitry 260 is coupled to control driver circuitry 270 that may include, for example, switching circuitry for controlling transistors (e.g., MOSFETs) S3 and S4 in order to cause driver circuitry (e.g., including appropriate switching elements) of power processing circuit 210 of main VR 202 to apply gate drive voltage $V_{GD}$ to transistor gates S1 and S2 of main VR 202 as shown. In this regard, gate VR 204 is configured to produce $V_{GD}$ as a $V_{OUT2}$ through inductor L2 to driver circuitry of power processing circuit 210 of main VR 202 and gates of transistors (e.g., MOSFETs) S1 and S2 of main VR 202. Capacitor C2 may also be coupled as shown between $V_{OUT2}$ and ground. $V_{OUT}$ from main VR 202 is provided as shown through inductor L1 to respective system load $R_O$. Capacitor C1 may also be coupled as shown between $V_{OUT}$ and ground.

In the practice of the disclosed systems and methods, operating efficiency of main VR 202 may be determined in any manner suitable for characterizing efficiency of voltage regulation operations occurring therein, e.g., efficiency based on the amount of power expended to regulate an input voltage $V_{IN}$ to an output voltage $V_{OUT}$. In one exemplary embodiment, operating efficiency of main VR 202 may be calculated as follows (see FIG. 2 for $I_{IN}$, $V_{IN}$ and $I_{OUT}$, $V_{OUT}$ of main VR 202). In the following equations, D represents duty cycle that is set by:

$I_{IN} = I_{OUT} * D$;

Output Power $(P_{OUT}) = V_{OUT} * I_{OUT}$;

Input Power $(P_{IN}) = V_{IN} * I_{IN}$; and

Efficiency $= P_{OUT}/P_{IN}$.

It will further be understood that any parameter that is representative of (or based upon) a calculated operating efficiency of main VR 202 may be employed in the place of a calculated operating efficiency value in the methodology disclosed elsewhere herein.

Figure 3:
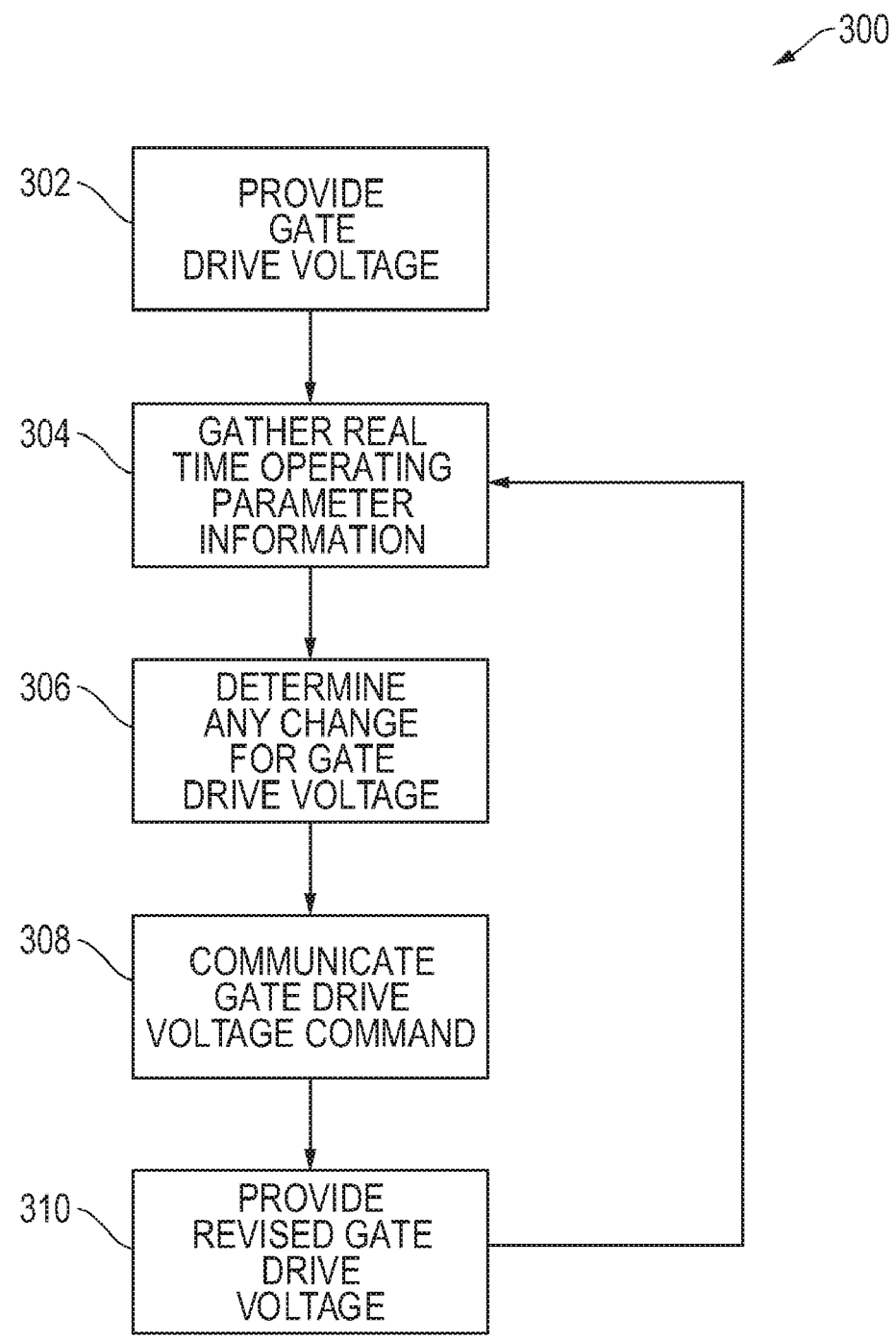
FIG. 3 illustrates methodology according to one exemplary embodiment of the disclosed systems and methods.

FIG. 3 illustrates one exemplary embodiment of methodology 300 that may be implemented to intelligently optimize voltage regulation efficiency of main VR 202 of FIG. 2A by varying gate drive voltage values provided by gate VR 204 based on measured operating efficiency of main VR 202. Upon power up of DC/DC voltage regulation circuitry 192, methodology 300 starts in step 302 where gate VR 204 provides an initial gate drive voltage to drive main VR 202. The initial gate drive voltage can be selected from a predetermined range, could be selected as a half-way or mid-range value between minimum and maximum gate drive voltage values that may be produced by gate VR 204, or may be selected in any other manner such as described further herein. In one exemplary embodiment, $V_{IN}$ may be 12 volts, gate VR 204 may be capable of providing gate drive voltages in a range from 5 volts to 12 volts, and the initial gate drive voltage of step 302 may be 9 volts, although any other initial gate drive voltage between 5 volts and 12 volts may be alternatively selected and provided.

Still referring to FIG. 3, methodology 300 proceeds to step 304 where power monitoring controller circuitry 220 gathers real time operating parameter information (e.g., $V_{IN}$, $V_{OUT}$, $I_{IN}$, $I_{OUT}$, operating efficiency of main VR 202, etc.), and communicates this gathered real time operating parameter information to gate drive voltage controller 206 through communication bus 208. In step 306, gate drive voltage controller 206 determines whether the initial gate drive voltage is to be increased, decreased or left unchanged based on the gathered real time operating parameter information received in step 304. Gate drive voltage controller 206 may make this determination using an algorithm or any other logic suitable for optimizing operating efficiency of main VR 202. Then in step 308, gate drive voltage controller 206 communicates a gate drive voltage command to gate VR 204 through communication bus 208. In step 310, gate VR 204 provides a revised gate drive voltage level to main VR 202 based on the gate drive voltage command received from gate drive voltage controller 206. The revised gate drive voltage level may have a voltage value that is greater, lesser or the same as the previous (e.g., initial) gate drive voltage value depending on the gate drive voltage command signal. Methodology 300 then returns to step 304 and steps 304 through 310 are then repeated in an iterative fashion as long as DC/DC voltage regulation circuitry 192 continues to operate.

Consequently, the provided gate drive voltage level may be constantly optimized, e.g., to match changing system load conditions ($V_{OUT}$, $I_{OUT}$) over time. For example, relatively higher gate drive voltage levels tend to result in increased operating efficiencies for relatively higher $I_{OUT}$ conditions, and relatively lower gate drive voltage levels tend to result in increased operating efficiencies for relatively lower $I_{OUT}$ conditions. In one exemplary embodiment methodology 300 may be repeated at time intervals of from about 0.5 millisecond to about 0.5 second depending on if the control algorithm resides locally or if the control algorithm resides on a bus where multiple VRs are connected, although it will be understood that methodology 300 may be repeated in time intervals of less than about 0.5 millisecond and in time intervals of greater than about 1 millisecond depending up on the available communication speed and number of VRs.

Figure 4A:
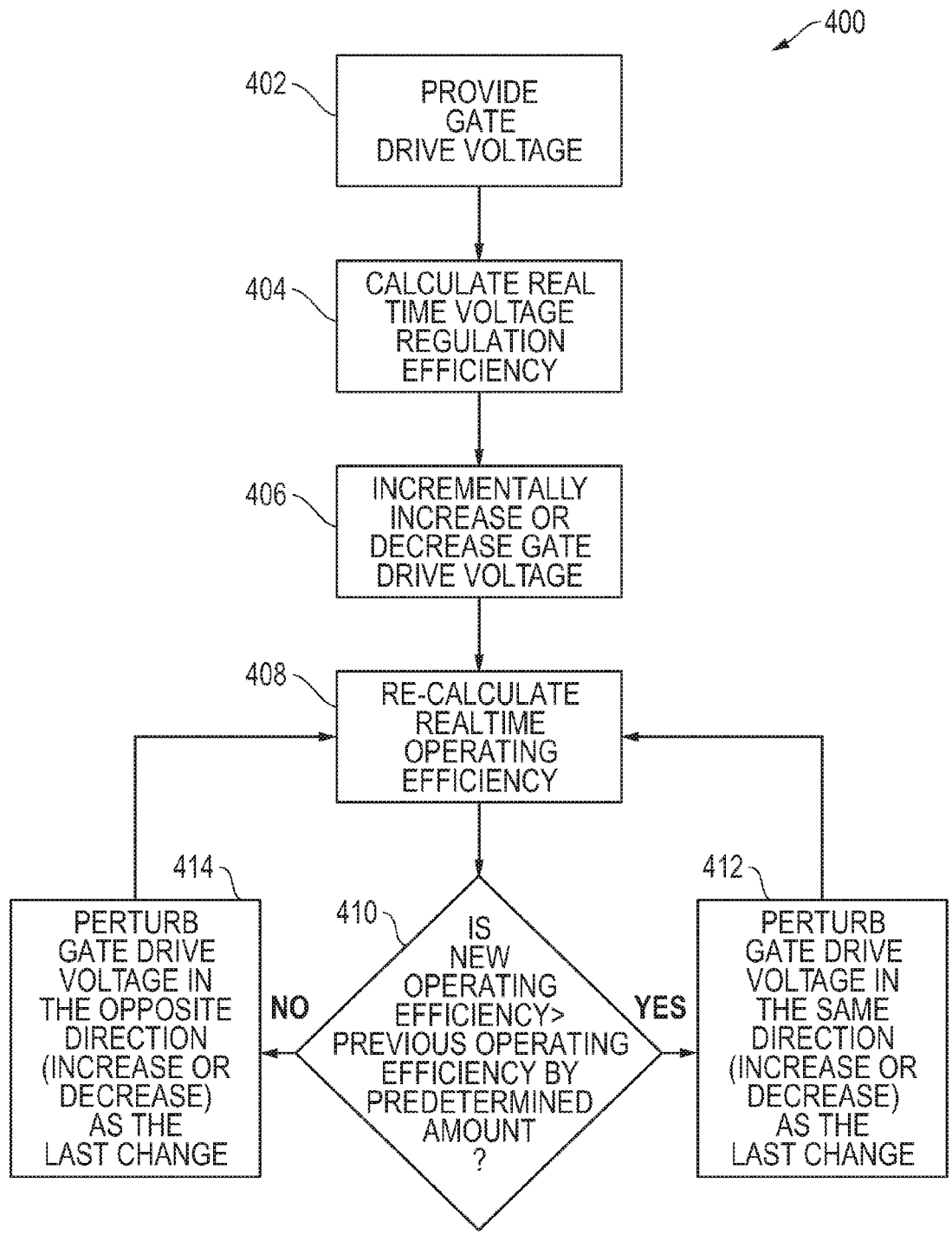
FIG. 4A illustrates methodology according to one exemplary embodiment of the disclosed systems and methods.

FIG. 4A illustrates methodology 400 according to another exemplary embodiment of the disclosed systems and methods. Using the algorithm of methodology 400, gate VR 204 generates a perturbation in its gate drive output voltage level based on an operating efficiency trend in main VR 202. For example, upon power up of DC/DC voltage regulation circuitry 192, methodology 400 starts in step 402 where gate VR 204 provides an initial gate drive voltage level $V_1$ (e.g., 9 volts or other arbitrary starting value) to drive main VR 202. In step 404, power monitoring controller circuitry 220 calculates initial real time operating efficiency of main VR 202 at the initial gate drive voltage level $V_1$ and communicates information representative of this initial operating efficiency value to gate drive voltage controller 206 through communication bus 208. In step 406, gate drive voltage controller 206 incrementally increases or decreases gate drive voltage value ($V_{GD}$) by a predetermined amount (e.g., 0.5 volts) to a revised gate drive voltage level $V_2$ by communicating a gate drive voltage command to gate VR 204 through communication bus 208. For this exemplary embodiment, it does not matter whether gate drive voltage is initially increased or decreased, and the predetermined amount of incremental increase or decrease in gate drive voltage level may be arbitrarily selected to be some fractional portion of the overall possible gate drive voltage range (e.g., 5 volts to 12 volts) that is suitably large enough to result in a change in operating efficiency of main VR 202.

In step 408 of FIG. 4A, power monitoring controller circuitry 220 re-calculates real time operating efficiency of main VR 202 at the revised gate drive voltage level $V_2$ and communicates information representative of this recalculated new operating efficiency value to gate drive voltage controller 206 through communication bus 208. Gate drive voltage controller 206 then compares the recalculated new operating efficiency value to the previous calculated initial operating efficiency value in step 410. If in step 410 the new operating efficiency value is greater than the previous operating efficiency value by a predetermined amount (e.g., by greater than about 0.1%), then in step 412 gate drive voltage controller 206 communicates a gate drive voltage command to gate VR 204 to incrementally change or perturb the gate drive voltage value again by the same predetermined amount (e.g., 0.5 volts), and in the same direction (increase or decrease) as the last change made to gate drive voltage value, to obtain a revised gate drive voltage level $V_3$. However, if in step 410 the new operating efficiency value is found not greater than the previous operating efficiency value by a predetermined amount (e.g., by greater than about 0.1%), then in step 414 gate drive voltage controller 206 communicates a gate drive voltage command to gate VR 204 to incrementally change or perturb the gate drive voltage value again by the same predetermined amount (e.g., 0.5 volts), but in the opposite direction (increase or decrease) as the last change made to gate drive voltage value, to obtain a revised gate drive voltage level $V_4$. Steps 408 thorough 414 are then repeated in an iterative fashion as long as DC/DC voltage regulation circuitry 192 continues to operate.

In the above-described manner, methodology 400 of FIG. 4A may be implemented so that the gate drive voltage will continue to change or perturb in the same direction (increase or decrease) as long as the predetermined amount of incremental improvement in operating efficiency of main VR 202 is observed. When this amount of efficiency improvement is no longer observed, then the direction (increase or decrease) of gate drive voltage change is reversed. Thus, main VR 202 may be driven in a manner so that it always operates close to the optimal operating efficiency level, despite changes in operating conditions (e.g., changes in system load characteristics), and despite variances in main VR design characteristics (types of MOSFETS and other circuitry) that may be employed to implement main VR 202 from application to application.

In a further exemplary embodiment, a self-learning methodology may be applied to the methodologies of FIGS. 3 and 4. In this exemplary embodiment, the starting value of gate drive voltage is only an arbitrary predetermined value the very first time that methodology 300 or 400 is implemented for a given DC/DC voltage regulation circuitry 192, i.e., the very first time that DC/DC voltage regulation circuitry 192 is powered up for a use session. Thereafter (i.e. on subsequent power ups), the starting value of gate drive voltage for step 302 or 402 may be determined based on previous run/s of methodology 300 or 400 during previous power up sessions so that the starting gate drive voltage level yield more efficient main VR operating efficiency from the beginning of the new power up session. For example, upon the start of each subsequent power up session, the starting value of gate drive voltage for step 302 or 402 may be the ending (optimized) value of gate drive voltage determined by methodology 300 or 400 during the most previous power up session, e.g., that is stored, for example, in memory of gate drive controller 206 or corresponding equivalent component in other embodiments of FIGS. 5-7. In another example, the starting value of gate drive voltage for step 302 or 402 for each new power up session may be an average or other statistical value derived from the ending (optimized) values of gate drive voltage determined by methodology 300 or 400 for multiple previous power up sessions.

In yet another example, a look-up table of optimum gate drive voltage versus one or more other selected operating parameters (e.g., $V_{IN}$, $V_{OUT}$, $I_{IN}$, $I_{OUT}$, etc.) may be created from multiple previous power up sessions by saving the optimized gate drive voltage determined by methodology 300 or 400 of each previous power up session versus a corresponding value/s of the selected operating parameter/s (e.g., measured by power monitoring circuitry 220 of FIG. 2A or corresponding equivalent component) for that given previous power up session.

Figure 5:
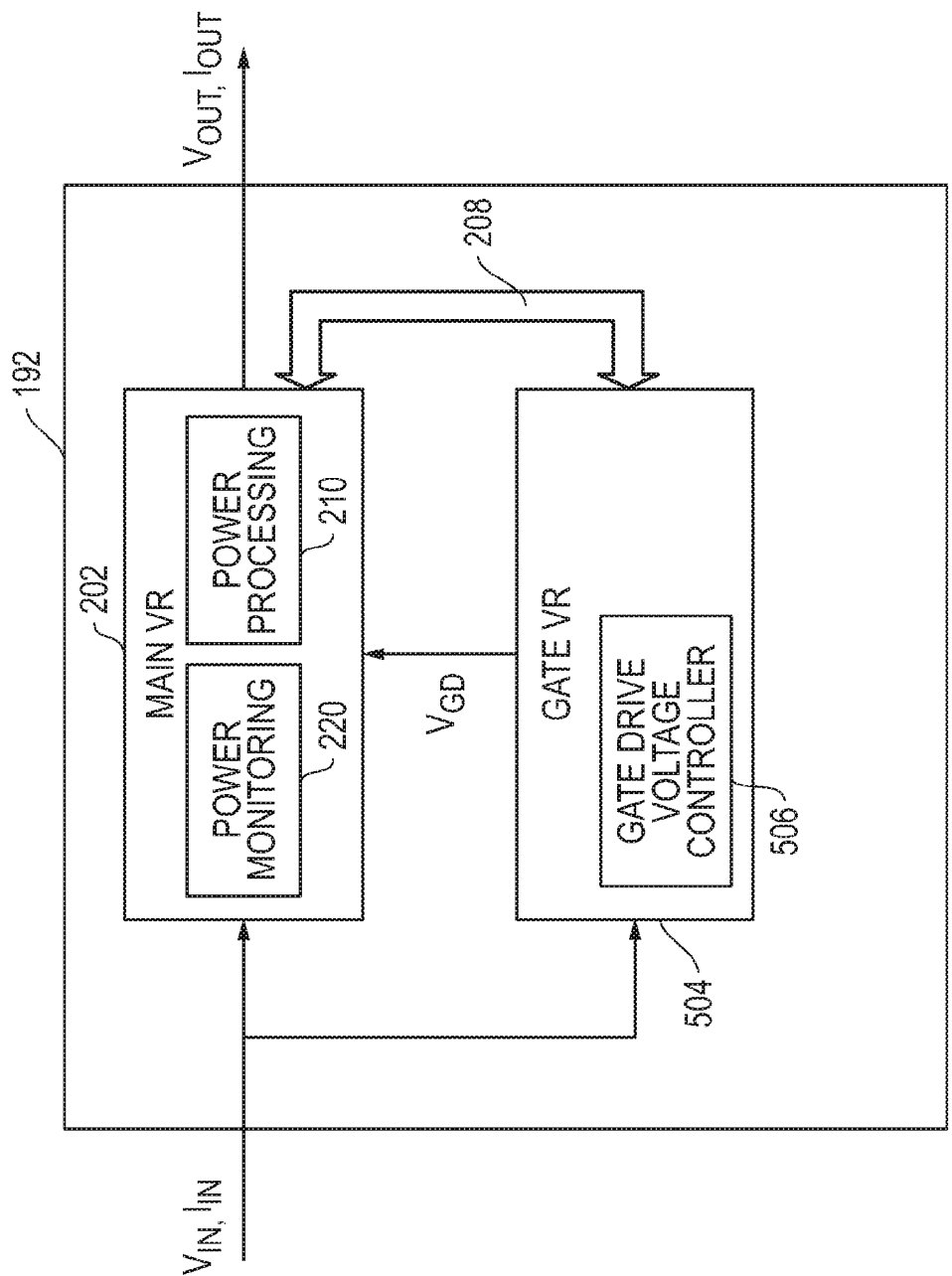
FIG. 5 is a simplified block diagram of DC/DC voltage regulation circuitry configured according to one exemplary embodiment of the disclosed systems and methods.
Figure 6:
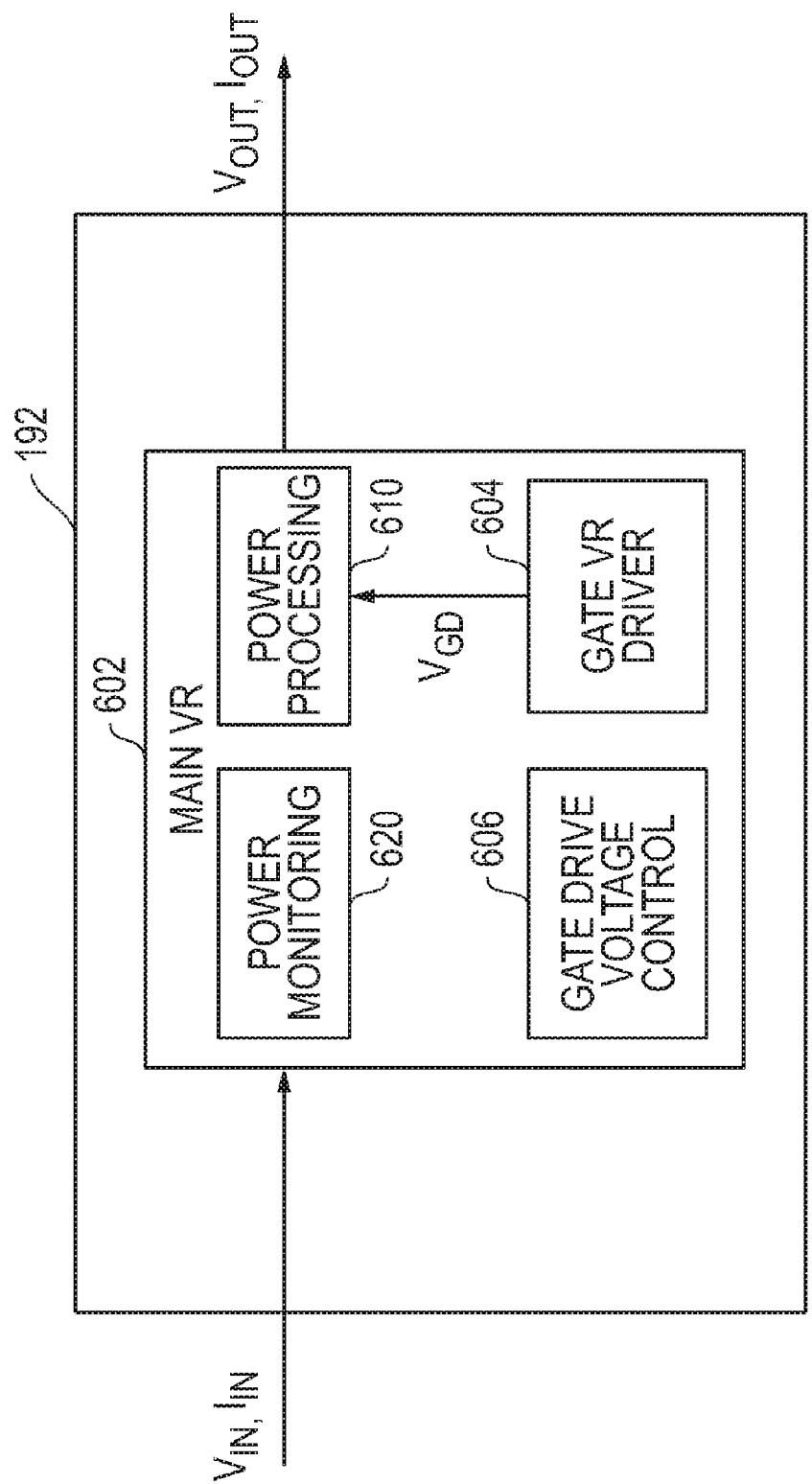
FIG. 6 is a simplified block diagram of DC/DC voltage regulation circuitry configured according to one exemplary embodiment of the disclosed systems and methods.
Figure 7:
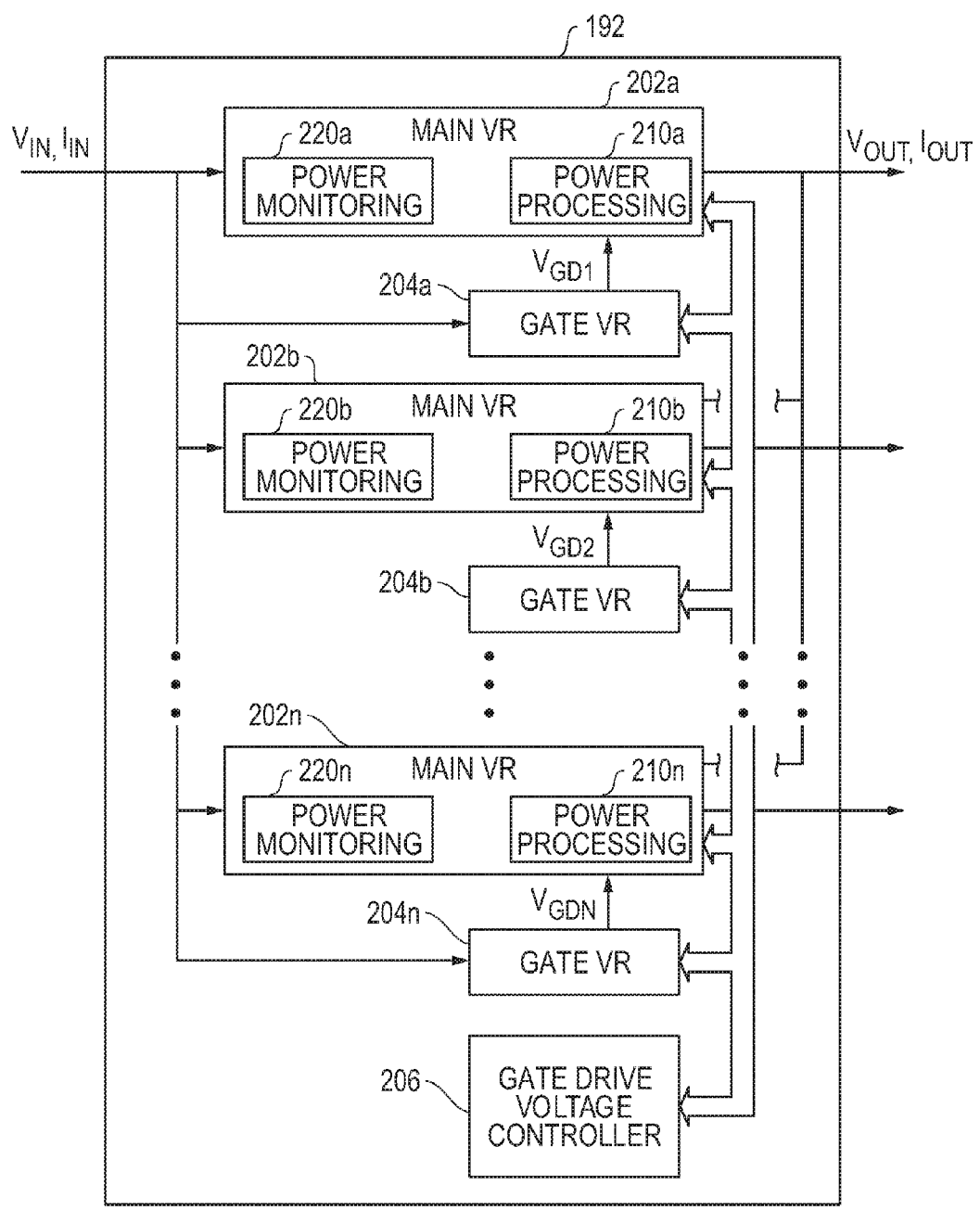
FIG. 7 is a simplified block diagram of DC/DC voltage regulation circuitry configured according to one exemplary embodiment of the disclosed systems and methods.

The lookup table may be stored, for example, in memory of gate drive controller 206 or corresponding equivalent component in other embodiments of FIGS. 5-7. Then for a new power up session, the starting value of gate drive voltage for step 302 or 402 is determined by measuring the selected operating parameter and then selecting the optimized starting value of gate drive voltage from the lookup table for step 302 or 402 that corresponds to the measured value of the selected operating parameter.

Figure 4B:
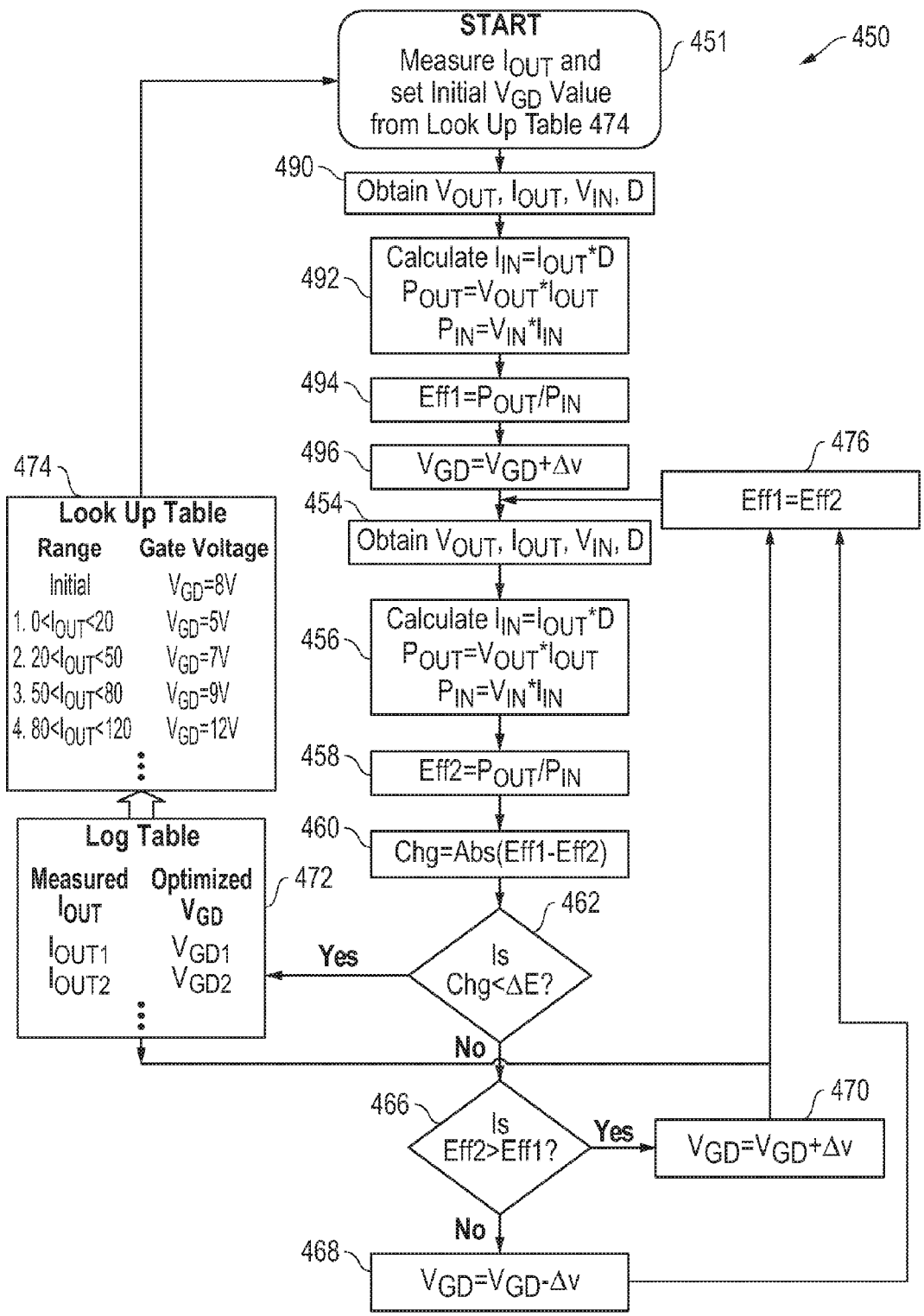
FIG. 4B illustrates methodology according to one exemplary embodiment of the disclosed systems and methods.

FIG. 4B illustrates methodology 450 in which a look-up table 474 of optimum gate drive voltage versus $I_{OUT}$ range may be generated, utilized and updated. As shown, methodology 450 starts out in step 451 upon the first power up with an initial gate drive voltage of 8 volts read from the first row of table 474. Such an initial power up value may be pre-defined and used prior to creation of any further entries in look-up table 474 during operation. It will be understood that 8 volts is exemplary only, and that the initial power up gate drive voltage may be any other suitable pre-determined voltage value for initializing method 450 to fit a given application. During subsequent power up sessions (i.e., after the look up table 474 has been completed with entries as will be further described herein), a value of optimum gate drive voltage $V_{GD}$ may be selected in step 451 from lookup table 474 based on the determined real time $I_{OUT}$ condition at step 451 for the present cycle (e.g., if $I_{OUT}$ is determined to be 25 amps, then initial $V_{GD}$ may be set to 7 volts) before preceding further.

Next, in step 490, the actual current real time operation conditions of $V_{IN}$, $I_{OUT}$, $V_{OUT}$ and D at the current $V_{GD}$ value are determined for the operating main VR 202. Next, current values of $I_{OUT}$, input power $P_{IN}$ and output power $P_{OUT}$ are determined for main VR 202 as shown in step 492 based on the determined current (real time) actual values of $V_{IN}$, $I_{OUT}$, $V_{OUT}$ and D, and then current (real time) main VR 202 operating efficiency (Eff1) is calculated in step 494. In step 496, $V_{GD}$ is incremented by adding a predefined incremental gate drive voltage ΔV (e.g., 1 volt or other predefined voltage value selected for a given application) to the previous gate drive voltage value $V_{GD}$ to obtain a new gate drive voltage.

Next, in step 454, the actual current operation conditions of $V_{IN}$, $I_{OUT}$, $V_{OUT}$ and D are again determined for the operating main VR 202, and current values of $I_{OUT}$, input power $P_{IN}$ and output power $P_{OUT}$ are determined for main VR 202 as shown in step 456 based on the determined current (real time) actual values of $V_{IN}$, $I_{OUT}$, $V_{OUT}$ and D. A new current (real time) main VR 202 operating efficiency (Eff2) at the incremented new $V_{GD}$ is then calculated in step 458. In step 460, the absolute value of the difference (Chg) between the previous calculated operating efficiency value (Eff1) and the newly calculated current operating efficiency value (Eff2) is calculated. This Chg value is then evaluated in step 462 versus a predefined incremental operating efficiency value (ΔE) in step 462 as shown. For example, ΔE may be predefined to be 0.5% or any other value that is suitable for a given application. If Chg is determined to be less than ΔE in step 462 then the current $V_{GD}$ value is considered optimized and a log table 472 is updated by recording the current $V_{GD}$ value and corresponding measured $I_{OUT}$ value. Methodology 450 then returns to step 476 where the process starts again with the exception that the previously calculated main VR operating efficiency value used for Eff1 is replaced with the newly determined current main VR operating efficiency Eff2, prior to recalculating an even newer determined current main VR operating efficiency Eff2 based on the latest real time operating conditions. The gate drive voltage set by gate VR 204 is left unchanged in this case.

As shown, lookup table 474 may be created in real-time using recorded data from log table 472. For example, Table 1 below shows the type of data which may be recorded during successive iterations of method 450, and from which ranges of data for lookup table 474 may be created, e.g., by grouping together multiple values of measured $I_{OUT}$ that share the same value of optimized $V_{GD}$, or substantially the same value of optimized $V_{GD}$ within a given tolerance. It will also be understood that the number of ranges may be increased over time as more optimized values of $V_{GD}$ versus measured $I_{OUT}$ are determined.

TABLE 1

Log Table

| Measured $I_{OUT}$, (amps) | Optimized Gate Drive Voltage $V_{GD}$ (volts) |
|---|---|
| 10 | 5 |
| 95 | 12 |
| 15 | 5 |
| 25 | 7 |
| 8 | 5 |
| 55 | 9 |
| 75 | 9 |
| 115 | 12 |
| ... | ... |
| ... | ... |

Returning to FIG. 4, if Chg is determined not to be less than ΔE in step 462, then an evaluation is made in step 466 by determining if the determined current operating efficiency value (Eff2) is greater than the initial predefined efficiency value (Eff1). If the current efficiency value (Eff2) is greater than the initial predefined efficiency value (Eff1), then the gate drive voltage set by gate VR 204 is changed by adding the predefined incremental gate drive voltage value ΔV (e.g., 1 volt) to the previous gate drive voltage value $V_{GD}$ to obtain a new gate drive voltage value $V_{GD}$ in step 470, and then methodology 450 returns to step 476 where the process starts again with the exception that the previously calculated main VR efficiency value used for Eff1 is replaced with the newly determined current main VR efficiency Eff2, prior to recalculating an even newer determined current main VR operating efficiency Eff2 based on the latest real time operating conditions.

On the other hand, if the determined current efficiency value (Eff2) is found in step 466 not to be greater than the initial predefined efficiency value (Eff1), then the gate drive voltage set by gate VR 204 is changed by subtracting the predefined incremental gate drive voltage value (ΔV) from the previous gate drive voltage value $V_{GD}$ in step 468 to obtain a new gate drive voltage value $V_{GD}$, and then methodology 450 returns to step 476 where the process starts again with the exception that the previously calculated main VR efficiency value used for Eff1 is replaced with the newly determined current main VR efficiency from Eff2, prior to an even newer value of Eff2 is calculated based on current operating conditions, i.e., each time methodology 450 returns to though step 476, the process is repeated in an iterative manner by replacing a previous determined efficiency value ($Eff_X$) used for Eff1 with the most recent determined current efficiency value ($Eff_{X+1}$) previously used for Eff2, and then calculating a new current efficiency value ($Eff_{X+2}$) to use next time for Eff2.

FIG. 5 shows DC/DC voltage regulation circuitry 192 as it may be implemented according to another exemplary embodiment of the disclosed systems and methods. In this exemplary embodiment, DC/DC voltage regulation circuitry 192 includes main VR 202 that is configured and coupled in a manner similar to that described in relation to FIG. 2A. DC/DC voltage regulation circuitry 192 of FIG. 5 is provided in this exemplary embodiment with gate VR 504 that includes integrated (local) gate drive voltage control 506. Like gate VR 204 of FIG. 2A, gate VR 504 is configured to apply a variable level of gate drive voltage $V_{GD}$ to transistor gates of main VR 202. However, in this embodiment gate VR 504 also includes integrated gate drive voltage control circuitry 506 that communicates with main VR 202 via communication bus 208, and that performs the same gate drive voltage control tasks preformed by separate gate drive voltage controller 206 of FIG. 2A. In this regard, integrated gate drive voltage control circuitry 506 may be of any suitable configuration for performing the communication and control tasks of separate gate drive voltage controller 206 described herein, e.g., microcontroller and/or processor coupled to memory, etc.

FIG. 6 shows DC/DC voltage regulation circuitry 192 as it may be implemented according to another exemplary embodiment of the disclosed systems and methods. In this exemplary embodiment, DC/DC voltage regulation circuitry 192 includes main VR 602 that is coupled between a DC power source and a system load in a manner similar to that described in relation to FIGS. 2 and 5. As shown in FIG. 6, main VR 602 includes power monitoring 620 and power processing circuit 610 that correspond respectively to power monitoring 220 and power processing circuit 210 of FIG. 2A. Also shown in FIG. 6 are integrated (local) gate drive voltage control 606 and gate VR drive 604. In this regard, gate drive voltage control 606 corresponds in function to gate drive voltage control 506 of FIG. 5, and gate VR drive 604 functions to provide a variable level of gate drive voltage $V_{GD}$ to power processing circuit 610 in a manner similar to gate VR 504 of FIG. 5 and gate VR 204 of FIG. 2A.

FIG. 7 shows DC/DC voltage regulation circuitry 192 as it may be implemented as a power train according to another exemplary embodiment of the disclosed systems and methods having multiple components provided with similar functionality to the components of FIG. 2A. In this exemplary embodiment, DC/DC voltage regulation circuitry 192 includes a plurality of main voltage regulation circuitry components (main VRs) 202a through 202n that are each coupled to receive input DC voltage ($V_{IN}$) (e.g., 12 volts DC input from AC/DC conversion circuitry 155 of FIG. 1) and current ($I_{IN}$), and that are each coupled to provide a regulated output DC voltage ($V_{OUT}$) and current ($I_{OUT}$) for powering system load components as part of a power train configuration that includes other main VRs 202a through 202n. Although three main VRs 202 are illustrated in FIG. 7, it will be understood that a power train configuration may be implemented with two or more main VRs 202. Further, it will be understood that not all main VRs in a given power train need to be active and producing current at a given time, i.e., it is possible that only a subset of main VRs 202 may be actively active at a given time.

As shown in FIG. 7, each main VR 202a through 202n includes respective power processing circuits 210a through 210n that is controlled to produce regulated output DC voltage $V_{OUT}$ and output current $I_{OUT}$. Each main VR 202a through 202n further includes respective power monitoring controller circuitry 220a through 220n that measures real time operating parameters such as $V_{IN}$, $V_{OUT}$, $I_{IN}$, $I_{OUT}$, etc. and/or calculates real time operating parameters such as operating efficiency, etc. As further shown in FIG. 7, DC/DC voltage regulation circuitry 192 of this embodiment also includes gate drive voltage regulation circuitry components (gate VRs) 204a through 204n that each applies a respective variable gate drive voltage $V_{GD1}$ to $V_{GDN}$ to transistor gates of a respective main VRs 202a through 202n as shown. Gate drive voltage controller 206 is coupled as shown to provide centralized control to each of main VRs 202a through 202n and gate VRs 204a through 204n by communication bus 208. In the embodiment of FIG. 7, gate drive voltage controller 206 receives real time operating parameters ($V_{IN}$, $V_{OUT}$, $I_{IN}$, $I_{OUT}$, etc.) from each of main VRs 202a through 202n and responds by controlling gate drive voltage level provided by each gate VR 204a through 204n to its corresponding respective main VR 202a through 202n based thereon, i.e. in a manner previously described in relation to FIGS. 1-6. In this regard, gate drive voltage controller 206 may simultaneously control multiple gate VRs 204a through 204n so as to simultaneously optimize efficiency of all main VRs 202 that are active in the power train.

Although not illustrated, it will be understood that it is possible in another embodiment to configure a plurality of the local-controlled main VR configurations described and illustrated with respect to either of FIG. 5 or 6 in a power train configuration.

Figure 8:
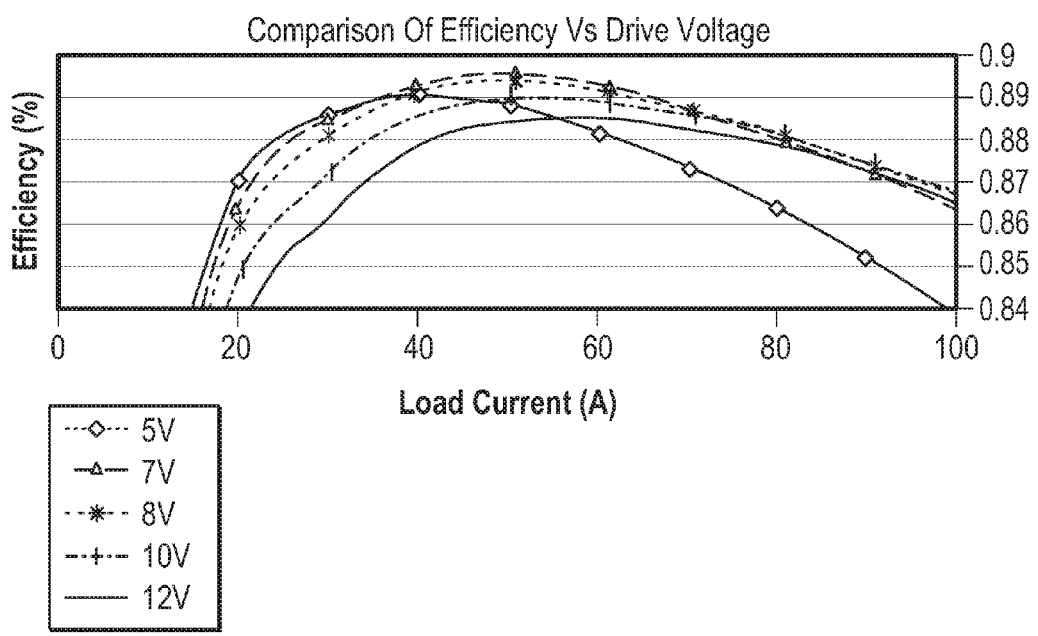
FIG. 8 shows efficiency versus load current for a CPU core voltage (Vcore) DC/DC voltage regulation circuitry design at five different fixed gate drive voltages.

FIG. 8 shows efficiency versus load current for a CPU core voltage (Vcore) DC/DC voltage regulation circuitry design at five different fixed gate drive voltages, i.e., 5 volts, 7 volts, 8 volts, 10 volts, and 12 volts. From the plot of FIG. 8 it may be seen that 5 volt gate drive voltage yields the best efficiency at a load of less than 30 amps and that 12 volt drive voltage gives the greatest efficiency when the load is greater than 90 amps. A recent study of server usage profile has shown that typical servers are loaded between 25 amps to 70 amps. Therefore, previous solutions that are limited to two fixed gate drive voltage levels of 5 volts and 12 volts fail to optimize the efficiency in the load range in which many servers are most likely to operate.

Figure 9:
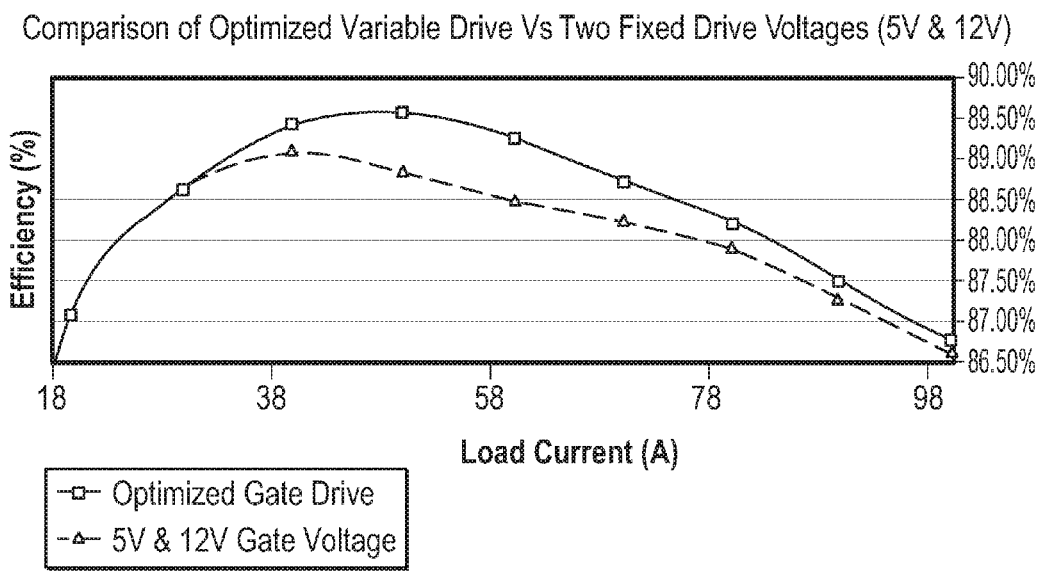
FIG. 9 shows a comparison of efficiency versus load current between a conventional gate drive voltage scheme and an optimized variable gate drive voltage methodology according to one exemplary embodiment of the disclosed systems and methods.

FIG. 9 is a plot of efficiency versus load current that shows the improvement in efficiency that is possible with the disclosed optimized variable gate drive voltage of the disclosed systems and methods (i.e., as it is implemented according to methodology 400 of the disclosed systems and methods) over a conventional gate drive voltage scheme that switches between two fixed drive voltages of 5 volts and 12 volts. In FIG. 9, the shaded region of the plot between the two curves represents the significant efficiency improvement in the operating range between approximately 30 amps and 100 amps.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method for regulating voltage in an information handling system, comprising:
   providing DC/DC voltage regulation circuitry coupled to supply power to a system load of said information handling system, said DC/DC voltage regulation circuitry including a power processing circuit comprising one or more drive transistors;
   providing gate drive voltage controller circuitry, power monitoring controller circuitry, and gate drive voltage regulation circuitry;
   using the gate drive voltage regulation circuitry to regulate power supplied by said DC/DC voltage regulation circuitry to said system load of said information handling system by driving the gate of said one or more drive transistors of said power processing circuit with two or more different gate drive voltage levels;
   using the power monitoring controller circuitry to determine two or more real time operating efficiency values of said power processing circuit while said power processing circuit is driven at each of two or more respective gate drive voltage levels; and
   using the gate drive voltage controller circuitry to vary the value of said gate drive voltage level provided by said gate drive voltage regulation circuitry to drive the gate of said one or more drive transistors of said power processing circuit, and using the gate drive voltage controller circuitry to determine whether the gate drive voltage is to be increased, decreased or left unchanged based on said determined two or more real time operating efficiency values of said power processing circuit;
   where the gate drive voltage controller circuitry is separate from the power processing circuit, the power monitoring controller circuitry, and the gate drive voltage regulation circuitry; and
   where the gate drive voltage controller circuitry comprises a microcontroller or processor.

2. The method of claim 1, further comprising:
   (a) using the gate drive voltage regulation circuitry to regulate voltage supplied by said DC/DC voltage regulation circuitry to said system load of said information handling system by driving the gate of said one or more drive transistors of said power processing circuit with a first gate drive voltage level, and using the power monitoring controller circuitry to determine a first real time operating efficiency of said power processing circuit while said power processing circuit is driven with said first gate drive voltage level;
   (b) using the gate drive voltage regulation circuitry to regulate voltage supplied by said DC/DC voltage regulation circuitry to said system load of said information handling system by driving the gate of said one or more drive transistors of said power processing circuit with a second gate drive voltage level that is greater than or less than said first gate drive voltage level, and using the power monitoring controller circuitry to determine a second real time operating efficiency of said power processing circuit while said power processing circuit is driven with said second gate drive voltage level;
   (c) using the gate drive voltage controller circuitry to compare said first real time operating efficiency to said second real time operating efficiency;
   (d) using the gate drive voltage controller circuitry to determine a third gate drive voltage level based on said comparison of said first real time operating efficiency to said second real time operating efficiency according to one of the following relationships:
      determining said third gate drive voltage level to be greater than said second gate drive voltage level if said second gate drive voltage level is greater than said first gate drive voltage level and said second real time operating efficiency is greater than said first real time operating efficiency, or
      determining said third gate drive voltage level to be less than said second gate drive voltage level if said second gate drive voltage level is greater than said first gate drive voltage level and said second real time operating efficiency is not greater than said first real time operating efficiency; or
      determining said third gate drive voltage level to be less than said second gate drive voltage level if said second gate drive voltage level is less than said first gate drive voltage level and said second real time operating efficiency is greater than said first real time operating efficiency; or
      determining said third gate drive voltage level to be greater than said second gate drive voltage level if said second gate drive voltage level is less than said first gate drive voltage level and said second real time operating efficiency is not greater than said first real time operating efficiency; and
   (e) using the gate drive voltage regulation circuitry to regulate voltage supplied by said DC/DC voltage regulation circuitry to said system load of said information handling system by driving the gate of said one or more drive transistors of said power processing circuit with said determined third gate drive voltage level.

3. The method of claim 2, further comprising iteratively repeating said steps (a) through (e) for the duration of time that said DC/DC voltage regulation circuitry is supplying power to said system load of said information handling system; wherein said first gate drive voltage level of step (a) of each subsequent iteration is equal to said third gate drive voltage level of step (e) of the immediately previous iteration.

4. The method of claim 2, wherein said step (d) further comprises using the gate drive voltage controller circuitry to determine said third gate drive voltage level based on said comparison of said first real time operating efficiency to said second real time operating efficiency according to one of the following relationships:
   determining said third gate drive voltage level to be greater than said second gate drive voltage level if said second gate drive voltage level is greater than said first gate drive voltage level and said second real time operating efficiency is greater than said first real time operating efficiency by a predetermined amount, or
   determining said third gate drive voltage level to be less than said second gate drive voltage level if said second gate drive voltage level is greater than said first gate drive voltage level and said second real time operating efficiency is not greater than said first real time operating efficiency by said predetermined amount; or
   determining said third gate drive voltage level to be less than said second gate drive voltage level if said second gate drive voltage level is less than said first gate drive voltage level and said second real time operating efficiency is greater than said first real time operating efficiency by said predetermined amount; or determining said third gate drive voltage level to be greater than said second gate drive voltage level if said second gate drive voltage level is less than said first gate drive voltage level and said second real time operating efficiency is not greater than said first real time operating efficiency by said predetermined amount.

5. The method of claim 1, further comprising using said drive voltage regulation circuitry to initially provide a predetermined value of said gate drive voltage level upon power up of said information handling system.

6. The method of claim 1, further comprising using the gate drive voltage controller circuitry to determine a value of said first gate drive voltage level based on previous optimized values of said gate drive voltage level.

7. The method of claim 1, further comprising providing a digital communication bus to couple together said power processing circuit, said power monitoring controller circuitry, said gate drive voltage regulation circuitry, and said gate drive voltage controller circuitry, the digital communication bus comprising at least one of a system management bus (SMBus), power management bus (PMBus), or inter-integrated circuitry (I$^2$C) bus; providing said real time operating efficiency values to said gate drive voltage controller circuitry from said power monitoring controller circuitry across said digital communication bus; and providing commands from said gate drive voltage controller to the gate drive voltage regulation circuitry across said digital communication bus to control said power processing circuit.

8. The method of claim 7, further comprising providing said real time operating efficiency values to said gate drive voltage controller circuitry from said power monitoring controller circuitry and providing commands from the gate drive voltage controller circuitry to the gate drive voltage regulation circuitry to control said power processing circuit all across the same common digital communication bus.

9. The method of claim 1, further comprising:
providing main voltage regulation circuitry that includes both said power processing circuit and said power monitoring controller circuitry together, the main voltage regulation circuitry being separate circuitry from the gate drive voltage controller circuitry;
providing a common digital communication bus that couples together the separate circuitries of the main voltage regulation circuitry, the main voltage regulation circuitry, and the gate drive voltage controller circuitry;
using the power monitoring controller circuitry of the main voltage regulation circuitry to gather real time operating parameter information;
using the power monitoring controller circuitry of the main voltage regulation circuitry to provide the gathered real time operating parameter information to the gate drive voltage controller circuitry across the common digital communication bus, the gathered real time operating parameter information including the real time operating efficiency of the main voltage regulation circuitry;
using the gate drive voltage controller circuitry to communicate a gate drive voltage command across the common digital communication bus to the gate drive voltage regulation circuitry to control the level of gate drive voltage provided by said gate drive voltage regulation circuitry based on the real time operating efficiency of the main voltage regulation circuitry.

10. The method of claim 9, where the gathered real time operating parameter information communicated across the common digital communication bus further includes real time input DC voltage (V$_{IN}$) to the DC/DC voltage regulation circuitry, real time input current (I$_{IN}$) to the DC/DC voltage regulation circuitry, real time output DC voltage (V$_{OUT}$) from the DC/DC voltage regulation circuitry, and real time output current (I$_{OUT}$) from the DC/DC voltage regulation circuitry; and where each of real time operating efficiency, V$_{IN}$, V$_{OUT}$, I$_{IN}$, and I$_{OUT}$ are all communicated in real time across the same common digital communication bus from the main voltage regulation circuitry to the gate drive voltage controller circuitry.

11. The method of claim 1, further comprising using the power monitoring controller circuitry to determine the duty cycle of the one or more drive transistors in order to regulate power to be supplied by said DC/DC voltage regulation circuitry to said system load of said information handling system.

12. DC/DC voltage regulation circuitry for an information handling system, comprising:
a power processing circuit configured to provide current of regulated output DC voltage to power a system load of an information handling system, said power processing circuit comprising one or more drive transistors;
power monitoring controller circuitry configured to determine real time operating efficiency values of said power processing circuit while said power processing circuit is driven at different gate drive voltage levels;
gate drive voltage regulation circuitry configured to provide gate drive voltage to drive the gate of said one or more drive transistors of said power processing circuit with two or more different gate drive voltage levels; and
gate drive voltage controller circuitry provided separate from the power processing circuit, the power monitoring controller circuitry, and the gate drive voltage regulation circuitry, the gate drive voltage controller circuitry being configured to control the level of gate drive voltage provided by said gate drive voltage regulation circuitry, the gate drive voltage controller circuitry being further configured to determine whether the gate drive voltage is to be increased, decreased or left unchanged based on said measured real time operating efficiency values of said power processing circuit;
where the gate drive voltage controller circuitry comprises a microcontroller or processor.

13. The DC/DC voltage regulation circuitry of claim 12, further comprising a digital communication bus that comprises at least one of a system management bus (SMBus), power management bus (PMBus), or inter-integrated circuitry (I$^2$C) bus; where said digital communication bus couples together said power processing circuit, said power monitoring controller circuitry, said gate drive voltage regulation circuitry, and said gate drive voltage controller circuitry; wherein said power monitoring controller circuitry is configured to provide said real time operating efficiency values to said gate drive voltage controller circuitry across said digital communication bus; and wherein said gate drive voltage controller circuitry is configured to provide commands to the gate drive voltage regulation circuitry across said digital communication bus to control said power processing circuit.

14. The DC/DC voltage regulation circuitry of claim 13, wherein said power monitoring controller circuitry is further configured to provide said real time operating efficiency values to said gate drive voltage controller circuitry across the same common digital communication bus across which said gate drive voltage controller circuitry provides commands to the gate drive voltage regulation circuitry to control said power processing circuit.

15. The DC/DC voltage regulation circuitry of claim 12, further comprising main voltage regulation circuitry coupled to said gate drive voltage regulation circuitry and said gate drive voltage controller circuitry by a digital communication bus that comprises at least one of a system management bus (SMBus), power management bus (PMBus), or inter-integrated circuitry (I²C) bus; and wherein said main voltage regulation circuitry includes said power processing circuit and said power monitoring controller circuitry.

16. The DC/DC voltage regulation circuitry of claim 12, wherein said gate drive voltage regulation circuitry is configured to provide gate drive voltage to drive the gate of said one or more drive transistors of said power processing circuit with first and second different gate drive voltage levels, said second gate drive voltage level being greater than or less than said first gate drive voltage level; wherein said power monitoring controller circuitry is configured to determine first and second real time operating efficiency values of said power processing circuit while said power processing circuit is driven with said respective first and second gate drive voltage levels; wherein said gate drive voltage controller circuitry is configured to compare said first real time operating efficiency to said second real time operating efficiency and to determine a third gate drive voltage level based on said comparison according to one of the following relationships:

said third gate drive voltage level determined to be greater than said second gate drive voltage level if said second gate drive voltage level is greater than said first gate drive voltage level and said second operating efficiency is greater than said first operating efficiency, or said third gate drive voltage level determined to be less than said second gate drive voltage level if said second gate drive voltage level is greater than said first gate drive voltage level and said second operating efficiency is not greater than said first operating efficiency; or said third gate drive voltage level determined to be less than said second gate drive voltage level if said second gate drive voltage level is less than said first gate drive voltage level and said second operating efficiency is greater than said first operating efficiency; or said third gate drive voltage level determined to be greater than said second gate drive voltage level if said second gate drive voltage level is less than said first gate drive voltage level and said second operating efficiency is not greater than said first operating efficiency; and wherein said gate drive voltage controller circuitry is further configured to control said gate drive voltage regulation circuitry to drive the gate of said one or more drive transistors of said power processing circuit with said determined third gate drive voltage level.

17. The DC/DC voltage regulation circuitry of claim 16, wherein said DC/DC voltage regulation circuitry is configured to iteratively repeat providing said first and second different gate drive voltage levels; wherein said power monitoring controller circuitry is configured to iteratively determine real time operating efficiency values of said power processing circuit while said power processing circuit is driven during each iteration with said first and second gate drive voltage levels; wherein said gate drive voltage controller circuitry is configured to iteratively compare said first real time operating efficiency to said second real time operating efficiency of each iteration and to determine a third gate drive control voltage level for each iteration based on said comparison and according to one of said relationships; and wherein said gate drive voltage controller is further configured to control said gate drive voltage regulation circuitry to drive the gate of said one or more drive transistors of said power processing circuit with said third gate drive voltage level determined each iteration.

18. The DC/DC voltage regulation circuitry of claim 12, wherein upon power up of said DC/DC voltage regulation circuitry, said gate drive voltage controller circuitry is configured to initially set said first gate drive voltage level to a pre-determined value.

19. The DC/DC voltage regulation circuitry of claim 12, wherein said gate drive voltage controller circuitry is configured to determine a value of said first gate drive voltage level based on previous optimized values of said gate drive voltage level.

20. The DC/DC voltage regulation circuitry of claim 12, where:

the main voltage regulation circuitry includes both said power processing circuit and said power monitoring controller circuitry together, the main voltage regulation circuitry being separate circuitry from the gate drive voltage controller circuitry;

the DC/DC voltage regulation circuitry further comprises a common digital communication bus that couples together the separate circuitries of the main voltage regulation circuitry, the main voltage regulation circuitry, and the gate drive voltage controller circuitry;

the power monitoring controller circuitry of the main voltage regulation circuitry is configured to gather real time operating parameter information, and to provide the gathered real time operating parameter information to the gate drive voltage controller circuitry across the common digital communication bus, the gathered real time operating parameter information including the real time operating efficiency of the main voltage regulation circuitry;

the gate drive voltage controller circuitry is configured to communicate a gate drive voltage command across the common digital communication bus to the gate drive voltage regulation circuitry to control the level of gate drive voltage provided by said gate drive voltage regulation circuitry based on the real time operating efficiency of the main voltage regulation circuitry.

21. The DC/DC voltage regulation circuitry of claim 20, where the gathered real time operating parameter information communicated across the common digital communication bus further includes real time input DC voltage ($V_{IN}$) to the DC/DC voltage regulation circuitry, real time input current ($I_{IN}$) to the DC/DC voltage regulation circuitry, real time output DC voltage ($V_{OUT}$) from the DC/DC voltage regulation circuitry, and real time output current ($I_{OUT}$) from the DC/DC voltage regulation circuitry; and where the power monitoring controller circuitry of the main voltage regulation circuitry is further configured to communicate each of real time operating efficiency, $V_{IN}$, $V_{OUT}$, $I_{IN}$, and $I_{OUT}$ all in real time across the same common digital communication bus from the main voltage regulation circuitry to the gate drive voltage controller circuitry.

22. The DC/DC voltage regulation circuitry of claim 12, where the power monitoring controller circuitry is configured to determine the duty cycle of the one or more drive transistors for regulating power to be supplied by said DC/DC voltage regulation circuitry to said system load of said information handling system.

23. The DC/DC voltage regulation circuitry of claim 12, where the provided gate drive voltage controller circuitry is not coupled or configured to measure any one of real time input DC voltage ($V_{IN}$) to the DC/DC voltage regulation circuitry, real time input current ($I_{IN}$) to the DC/DC voltage regulation circuitry, real time output DC voltage ($V_{OUT}$) from the DC/DC voltage regulation circuitry, or real time output current ($I_{OUT}$) from the DC/DC voltage regulation circuitry;

and where the provided gate drive voltage controller circuitry is not coupled or configured to determine duty cycle or the real time operating efficiency of the main voltage regulation circuitry.

24. An information handling system, comprising:
a system load; and
DC/DC voltage regulation circuitry comprising:
  a power processing circuit coupled to provide current of regulated output DC voltage to power said system load, said power processing circuit comprising one or more drive transistors,
  power monitoring controller circuitry configured to determine real time operating efficiency values of said power processing circuit while said power processing circuit is driven at different gate drive voltage levels,
  gate drive voltage regulation circuitry configured to provide gate drive voltage to drive the gate of said one or more drive transistors of said power processing circuit with two or more different gate drive voltage levels,
  gate drive voltage controller circuitry provided separate from the power processing circuit, the power monitoring controller circuitry, and the gate drive voltage regulation circuitry, the gate drive voltage controller circuitry being configured to control the level of gate drive voltage provided by said gate drive voltage regulation circuitry, the gate drive voltage controller circuitry being further configured to determine whether the gate drive voltage is to be increased, decreased or left unchanged based on said measured real time operating efficiency values of said power processing circuit, and
  where the gate drive voltage controller circuitry comprises a microcontroller or processor.

25. The information handling system of claim 24, wherein said gate drive voltage regulation circuitry is configured to provide gate drive voltage to drive the gate of said one or more drive transistors of said power processing circuit with first and second different gate drive voltage levels, said second gate drive voltage level being greater than or less than said first gate drive voltage level; wherein said power monitoring controller circuitry is configured to determine first and second real time operating efficiency values of said power processing circuit while said power processing circuit is driven with said respective first and second gate drive voltage levels; wherein said gate drive voltage controller circuitry is configured to compare said first real time operating efficiency to said second real time operating efficiency and to determine a third gate drive voltage level based on said comparison according to one of the following relationships:
  said third gate drive voltage level determined to be greater than said second gate drive voltage level if said second gate drive voltage level is greater than said first gate drive voltage level and said second operating efficiency is greater than said first operating efficiency, or
  said third gate drive voltage level determined to be less than said second gate drive voltage level if said second gate drive voltage level is greater than said first gate drive voltage level and said second operating efficiency is not greater than said first operating efficiency; or
  said third gate drive voltage level determined to be less than said second gate drive voltage level if said second gate drive voltage level is less than said first gate drive voltage level and said second operating efficiency is greater than said first operating efficiency; or
  said third gate drive voltage level determined to be greater than said second gate drive voltage level if said second gate drive voltage level is less than said first gate drive voltage level and said second operating efficiency is not greater than said first operating efficiency; and
  wherein said gate drive voltage controller circuitry is further configured to control said gate drive voltage regulation circuitry to drive the gate of said one or more drive transistors of said power processing circuit with said determined third gate drive voltage level.

26. The information handling system of claim 25, wherein said DC/DC voltage regulation circuitry is configured to iteratively repeat providing said first and second different gate drive voltage levels; wherein said power monitoring controller circuitry is configured to iteratively determine real time operating efficiency values of said power processing circuit while said power processing circuit is driven during each iteration with said first and second gate drive voltage levels; wherein said gate drive voltage controller circuitry is configured to iteratively compare said first real time operating efficiency to said second real time operating efficiency of each iteration and to determine a third gate drive control voltage level for each iteration based on said comparison and according to one of said relationships; and wherein said gate drive voltage controller is further configured to control said gate drive voltage regulation circuitry to drive the gate of said one or more drive transistors of said power processing circuit with said third gate drive voltage level determined each iteration.

27. The information handling system of claim 24, wherein said gate drive voltage controller circuitry is configured to determine a value of said first gate drive voltage level based on previous optimized values of said gate drive voltage level.

28. The information handling system of claim 24, further comprising a digital communication bus that comprises at least one of a system management bus (SMBus), power management bus (PMBus), or inter-integrated circuitry (I²C) bus; where said digital communication bus couples together said power processing circuit, said power monitoring controller circuitry, said gate drive voltage regulation circuitry, and said gate drive voltage controller circuitry; wherein said power monitoring controller circuitry is configured to provide said real time operating efficiency values to said gate drive voltage controller circuitry across said digital communication bus; and wherein said gate drive voltage controller circuitry is configured to provide commands to the gate drive voltage regulation circuitry across said digital communication bus to control said power processing circuit.

29. The information handling system of claim 24, further comprising main voltage regulation circuitry coupled to said gate drive voltage regulation circuitry and said gate drive voltage controller circuitry by a digital communication bus that comprises at least one of a system management bus (SMBus), power management bus (PMBus), or inter-integrated circuitry (I²C) bus; and wherein said main voltage regulation circuitry includes said power processing circuit and said power monitoring controller circuitry.

30. A method for regulating voltage in an information handling system, comprising:
  providing DC/DC voltage regulation circuitry coupled to supply power to a system load of said information handling system, said DC/DC voltage regulation circuitry including a power processing circuit comprising one or more drive transistors;
  providing gate drive voltage controller circuitry, power monitoring controller circuitry, and gate drive voltage regulation circuitry;
  using the gate drive voltage regulation circuitry to regulate power supplied by said DC/DC voltage regulation circuitry to said system load of said information handling system by driving the gate of said one or more drive transistors of said power processing circuit with two or more different gate drive voltage levels;

using the power monitoring controller circuitry to determine two or more real time operating efficiency values of said power processing circuit while said power processing circuit is driven at each of two or more respective gate drive voltage levels; and using the gate drive voltage controller circuitry to vary the value of said gate drive voltage level provided by said gate drive voltage regulation circuitry to drive the gate of said one or more drive transistors of said power processing circuit based on a comparison of said determined two or more real time operating efficiency values of said power processing circuit;

where the gate drive voltage controller circuitry is separate from the power processing circuit, the power monitoring controller circuitry, and the gate drive voltage regulation circuitry;

where the gate drive voltage controller circuitry comprises a microcontroller or processor; and where the method further comprises:

providing a digital communication bus to couple together said power processing circuit, said power monitoring controller circuitry, said gate drive voltage regulation circuitry, and said gate drive voltage controller circuitry, the digital communication bus comprising at least one of a system management bus (SMBus), power management bus (PMBus), or inter-integrated circuitry ($I_2C$) bus, and providing said real time operating efficiency values to said gate drive voltage controller circuitry from said power monitoring controller circuitry across said digital communication bus; and providing commands from said gate drive voltage controller to the gate drive voltage regulation circuitry across said digital communication bus to control said power processing circuit.

31. DC/DC voltage regulation circuitry for an information handling system, comprising:

a power processing circuit configured to provide current of regulated output DC voltage to power a system load of an information handling system, said power processing circuit comprising one or more drive transistors;

power monitoring controller circuitry configured to determine the regulated output DC voltage (VOUT) of the power to be supplied by said DC/DC voltage regulation circuitry to said system load of said information handling system, and to determine real time operating efficiency values of said power processing circuit while said power processing circuit is driven at different gate drive voltage levels;

gate drive voltage regulation circuitry configured to provide gate drive voltage to drive the gate of said one or more drive transistors of said power processing circuit with two or more different gate drive voltage levels; and gate drive voltage controller circuitry provided separate from the power processing circuit, the power monitoring controller circuitry, and the gate drive voltage regulation circuitry, the gate drive voltage controller circuitry being configured to control the level of gate drive voltage provided by said gate drive voltage regulation circuitry based on said measured real time operating efficiency values of said power processing circuit;

where the gate drive voltage controller circuitry comprises a microcontroller or processor;

where the DC/DC voltage regulation circuitry further comprises a digital communication bus that comprises at least one of a system management bus (SMBus), power management bus (PMBus), or inter-integrated circuitry ($I_2C$) bus;

where said digital communication bus couples together said power processing circuit, said power monitoring controller circuitry, said gate drive voltage regulation circuitry, and said gate drive voltage controller circuitry;

wherein said power monitoring controller circuitry is configured to provide said real time operating efficiency values to said gate drive voltage controller circuitry across said digital communication bus; and wherein said gate drive voltage controller circuitry is configured to provide commands to the gate drive voltage regulation circuitry across said digital communication bus to control said power processing circuit.

32. An information handling system, comprising:

a system load; and

DC/DC voltage regulation circuitry comprising:

a power processing circuit coupled to provide current of regulated output DC voltage to power said system load, said power processing circuit comprising one or more drive transistors, power monitoring controller circuitry configured to determine the regulated output DC voltage (VOUT) of the power to be supplied by said DC/DC voltage regulation circuitry to said system load, and to determine real time operating efficiency values of said power processing circuit while said power processing circuit is driven at different gate drive voltage levels, gate drive voltage regulation circuitry configured to provide gate drive voltage to drive the gate of said one or more drive transistors of said power processing circuit with two or more different gate drive voltage levels, gate drive voltage controller circuitry provided separate from the power processing circuit, the power monitoring controller circuitry, and the gate drive voltage regulation circuitry, the gate drive voltage controller circuitry being configured to control the level of gate drive voltage provided by said gate drive voltage regulation circuitry based on said measured real time operating efficiency values of said power processing circuit, and where the gate drive voltage controller circuitry comprises a microcontroller or processor;

where the information handling system further comprises a digital communication bus that comprises at least one of a system management bus (SMBus), power management bus (PMBus), or inter-integrated circuitry ($I_2C$) bus;

where said digital communication bus couples together said power processing circuit, said power monitoring controller circuitry, said gate drive voltage regulation circuitry, and said gate drive voltage controller circuitry;

wherein said power monitoring controller circuitry is configured to provide said real time operating efficiency values to said gate drive voltage controller circuitry across said digital communication bus; and wherein said gate drive voltage controller circuitry is configured to provide commands to the gate drive voltage regulation circuitry across said digital communication bus to control said power processing circuit.

33. A method for regulating voltage in an information handling system, comprising:

providing DC/DC voltage regulation circuitry coupled to supply power to a system load of said information handling system, said DC/DC voltage regulation circuitry including a power processing circuit comprising one or more drive transistors;

providing gate drive voltage controller circuitry, power monitoring controller circuitry, and gate drive voltage regulation circuitry:

using the gate drive voltage regulation circuitry to regulate power supplied by said DC/DC voltage regulation circuitry to said system load of said information handling system by driving the gate of said one or more drive transistors of said power processing circuit with two or more different gate drive voltage levels;

using the power monitoring controller circuitry to determine two or more real time operating efficiency values of said power processing circuit while said power processing circuit is driven at each of two or more respective gate drive voltage levels; and using the gate drive voltage controller circuitry to vary the value of said gate drive voltage level provided by said gate drive voltage regulation circuitry to drive the gate of said one or more drive transistors of said power processing circuit based on a comparison of said determined two or more real time operating efficiency values of said power processing circuit;

where the gate drive voltage controller circuitry is separate from the power processing circuit, the power monitoring controller circuitry, and the gate drive voltage regulation circuitry; and where the gate drive voltage controller circuitry comprises a microcontroller or processor;

where the method further comprises:

(a) using the gate drive voltage regulation circuitry to regulate voltage supplied by said DC/DC voltage regulation circuitry to said system load of said information handling system by driving the gate of said one or more drive transistors of said power processing circuit with a first gate drive voltage level, and using the power monitoring controller circuitry to determine a first real time operating efficiency of said power processing circuit while said power processing circuit is driven with said first gate drive voltage level, (b) using the gate drive voltage regulation circuitry to regulate voltage supplied by said DC/DC voltage regulation circuitry to said system load of said information handling system by driving the gate of said one or more drive transistors of said power processing circuit with a second gate drive voltage level that is greater than or less than said first gate drive voltage level, and using the power monitoring controller circuitry to determine a second real time operating efficiency of said power processing circuit while said power processing circuit is driven with said second gate drive voltage level, (c) using the gate drive voltage controller circuitry to compare said first real time operating efficiency to said second real time operating efficiency, (d) using the gate drive voltage controller circuitry to determine a third gate drive voltage level based on said comparison of said first real time operating efficiency to said second real time operating efficiency according to one of the following relationships:

determining said third gate drive voltage level to be greater than said second gate drive voltage level if said second gate drive voltage level is greater than said first gate drive voltage level and said second real time operating efficiency is greater than said first real time operating efficiency, or determining said third gate drive voltage level to be less than said second gate drive voltage level if said second gate drive voltage level is greater than said first gate drive voltage level and said second real time operating efficiency is not greater than said first real time operating efficiency; or determining said third gate drive voltage level to be less than said second gate drive voltage level if said second gate drive voltage level is less than said first gate drive voltage level and said second real time operating efficiency is greater than said first real time operating efficiency; or determining said third gate drive voltage level to be greater than said second gate drive voltage level if said second gate drive voltage level is less than said first gate drive voltage level and said second real time operating efficiency is not greater than said first real time operating efficiency; and (e) using the gate drive voltage regulation circuitry to regulate voltage supplied by said DC/DC voltage regulation circuitry to said system load of said information handling system by driving the gate of said one or more drive transistors of said power processing circuit with said determined third gate drive voltage level; and wherein said step (d) further comprises using the gate drive voltage controller circuitry to determine said third gate drive voltage level based on said comparison of said first real time operating efficiency to said second real time operating efficiency according to one of the following relationships:

determining said third gate drive voltage level to be greater than said second gate drive voltage level if said second gate drive voltage level is greater than said first gate drive voltage level and said second real time operating efficiency is greater than said first real time operating efficiency by a predetermined amount, or determining said third gate drive voltage level to be less than said second gate drive voltage level if said second gate drive voltage level is greater than said first gate drive voltage level and said second real time operating efficiency is not greater than said first real time operating efficiency by said predetermined amount; or determining said third gate drive voltage level to be less than said second gate drive voltage level if said second gate drive voltage level is less than said first gate drive voltage level and said second real time operating efficiency is greater than said first real time operating efficiency by said predetermined amount; or determining said third gate drive voltage level to be greater than said second gate drive voltage level if said second gate drive voltage level is less than said first gate drive voltage level and said second real time operating efficiency is not greater than said first real time operating efficiency by said predetermined amount.

* * * * *